Nov. 17, 1931.  W. J. MATTSON  1,832,228
FAUCET OR VALVE
Filed Jan. 22, 1927
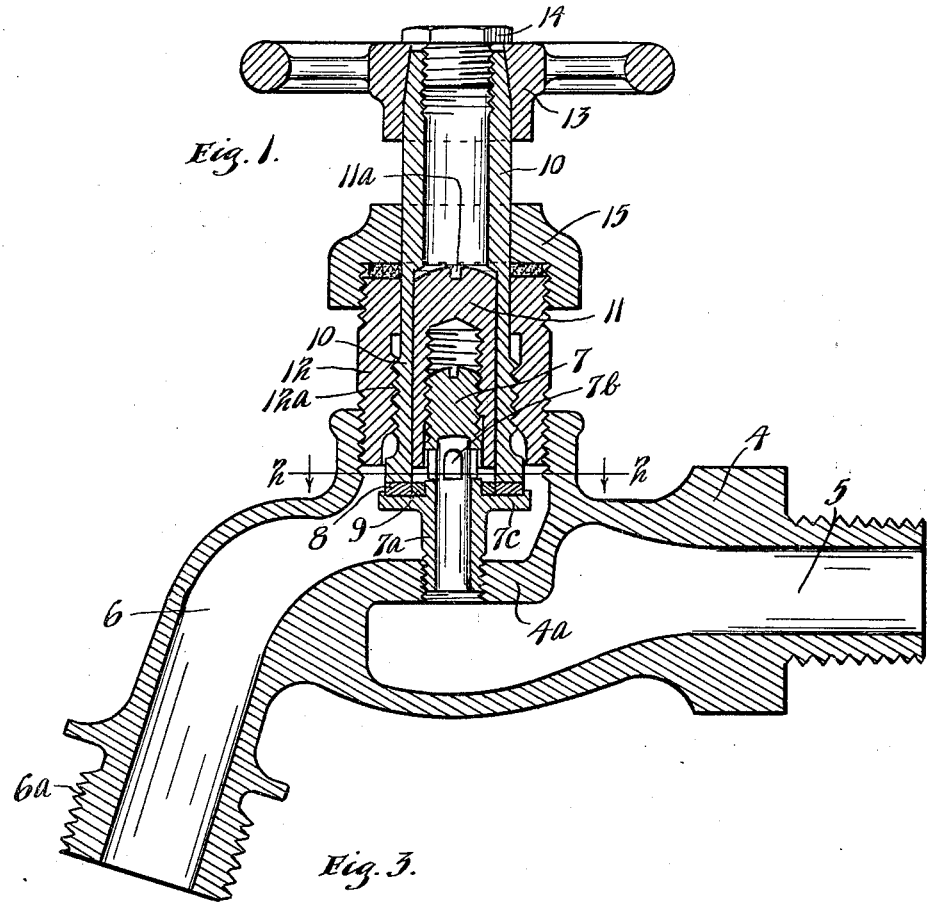
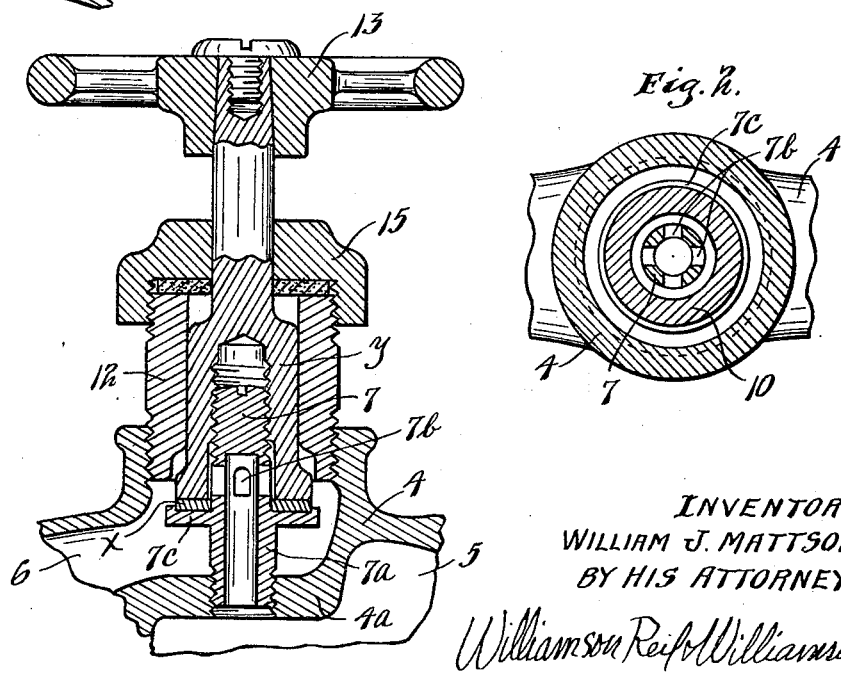
INVENTOR.
WILLIAM J. MATTSON.
BY HIS ATTORNEYS.

Patented Nov. 17, 1931

1,832,228

UNITED STATES PATENT OFFICE

WILLIAM J. MATTSON, OF ST. PAUL, MINNESOTA

FAUCET OR VALVE

Application filed January 22, 1927. Serial No. 162,789.

This invention relates to faucets or valves, and especially to such devices adapted to regulate the flow of fluid.

In commercial faucets generally utilized at this time the valve seat usually becomes worn in a comparatively short time, and cannot be repaired efficiently. The usual method of repairing a leaky faucet is to insert a new washer in the valve which, if the seat is not worn to a considerable extent, will be effective for some time. However, when the seat is worn to any considerable extent the faucet must be discarded and a new one supplied.

My invention has for its main object to provide a comparatively simple but highly efficient faucet or valve structure, wherein the parts of the valve subjected to wear may be readily removed, and quickly repaired to render the device as efficient as when new.

A further object of the invention is to provide a highly efficient faucet or valve for regulating the flow of fluid having means for shutting off the flow of liquid when it is desirable to repair the parts of the valve proper.

A more specific object is to provide in a faucet or valve a seat which may be supplied with a washer and a sleeve valve adapted to be projected against said seat and capable of being easily removed from the faucet for repair.

These and other objects of the invention will be apparent from the following description made in connection with the accompanying drawings, wherein like characters refer to similar parts throughout the several views, and in which:

Fig. 1 is a vertical section on an enlarged scale of a preferred embodiment of my invention;

Fig. 2 is a cross section taken on the line 2—2 of Fig. 1; and

Fig. 3 is a cross section of a modified form of the invention.

In the preferred form illustrated in Figs. 1 and 2 a core or body of the faucet or valve is indicated by the numeral 4, having an intake passage 5 provided with a threaded outer end and extending to the lower central portion of body 4. An outlet passage or discharge nozzle 6 extends from the upper central portion of the body 4 outwardly and downwardly, terminating as illustrated in the threaded portion 6a.

An upstanding stud 7 is threadedly secured to and supported from the partition 4a extending between the inner ends of the intake and discharge passages. Stud 7 comprises a lower open ended sleeve portion 7a having communication at its lower extremity with the inner end of intake passage 5 and having a plurality of radially disposed outlet ports 7b, communicating with the inner end of the outlet passage 6 when the valve is open. Stud 7 also includes an annular substantially horizontal recessed seat 7c disposed medially of its extremities. Outer and inner annular washers 8 and 9 respectively may be concentrically supported in the recessed portion of seat 7c adapted to be engaged by the lower annular edges of a pair of telescoped sleeves 10 and 11 respectively. Inner sleeve 11 is closed at its upper end and is threaded internally to the upper extremity of stud 7, thereby adapted for movement against its respective washer 9. An upstanding sleeve or fitting 12 is threaded to the upper central portion of body 4 encircling the sleeves 10 and 11 and carrying the internal threads 12a engaging external threads on the lower portion of sleeve 10 to permit movement of said sleeve against its seat, that is, against washer 8. Sleeve 10 has an upper end having a tapered exterior adapted to receive the hub of the handle 13, which is shown of wheel type. A threaded plug 14 engaging the interior of sleeve 10 rigidly secures the handle to the upper extremity thereof.

A suitable packing gland 15 surrounds the intermediate portion of sleeve 10 above casing 12 having threaded engagement with the upper end of said casing and a washer or packing may be interposed between the undersurface thereof and the upper end of casing 12.

The upper closed extremity of sleeve member 11 is provided with a slot 11a adapted to receive a screw driver to facilitate manipulation thereof, when plug 14 is removed or when sleeve 10 is removed from the device.

The modified form of the invention illustrated in Fig. 3 is similar in most respects to the preferred form, with the exception that the shut off valve or sleeve 11 is eliminated. In said modification, the body 4 is provided with the intake and discharge passages 5 and 6, generally similar in shape and arrangement to the passages in the preferred form. The upstanding stud 7 is threadedly secured to the partition 4a and carries the annular horizontal seat 7c, in which a washer x is seated. The valve or sleeve y is internally threaded to engage the threaded upper extremity of stud 7 to permit movement of the annular engaging end with washer x. The casing or fitting 12 is threaded to the upper central portion of body 4 and carries at its upper end the packing gland 15 surrounding the stem of valve y. Communication between the intake and discharge passages is made through the hollow portion of stud 7, the radially disposed discharge ports 7b being provided as in the case of the preferred form.

Operation

The operation of the described device may be briefly summarized as follows:

In the preferred embodiment illustrated in Figs. 1 and 2, the shut off valve or inner sleeve 11 will normally be turned to open position, as shown in Fig. 1, its lower extremity being spaced some distance from the upper surface of washer 9. The main valve or outer sleeve 10 may be withdrawn from engagement with its seat by turning handle 13, thus permitting the flow of fluid from exhaust ports 7b into discharge passage 6. If the engaging edge or lower extremity of sleeve valve 10 becomes worn, as it will with continuous usage, the sleeve 10 and its surrounding parts may be readily removed from the body of the faucet whereby access may be had to washers 8 and 9 and the engaging edge may be quickly filed or ground to render the valve as efficient as new.

Sleeve 11 constitutes a shut off valve which may be closed by removing plug 14, inserting a screw driver through sleeve 10 and turning sleeve 11 until the lower edge thereof engages the upper surface of washer 9. The flow of fluid through the faucet or valve may thus be closed to permit the main valve 10 to be removed for repair or inspection. Sleeves 10 and 11 are telescoped in such manner that the outer sleeve may be easily withdrawn when fitting 12 has been unscrewed from body 4.

It will be seen that the outer washer 8 forming the seat proper for the main valve may be easily removed with a small tool such as an awl when sleeve 10 and fitting 12 have been removed from the device. This will not in any way interfere with the engagement between the shut off valve and washer 9.

In the modified form shown in Fig. 3, the operation of valve y is essentially similar to the operation of sleeve valve 10 in the preferred embodiment. However, the movement of valve y against its seat is performed through the threaded engagement of the interior portion of valve y with the upper portion of stud 7. It will be seen that in this modified form, assuming the flow of fluid through the faucet to be shut off at another point, the valve y and fitting 12 may be easily removed from body 4 to file or grind the engagement edge or to replace the washer x.

It will be seen from the foregoing description that I have invented a simple but highly efficient valve or faucet structure, capable of wide general usage, and attaining new and improved results over the ordinary faucet structure commercially employed at this time.

It will, of course, be understood that various changes may be made in the form, details, arrangement and proportions of parts without departing from the scope of the invention.

What is claimed is:

1. In faucet or valve structure, a body having an intake and an outlet passage therein, said passages being disposed in juxtaposition, means adapted to connect said passages, concentric outer and inner valve seats encircling said means and disposed in the same plane, an inner longitudinally movable valve adapted to engage said inner seat and an outer longitudinally movable valve having a sleeved portion surrounding said inner valve and terminating in an annular edge concentric with said outer seat.

2. In faucet or valve structure, a body having an intake and an outlet passage therein, said passages being disposed in juxtaposition, a relatively small connection between said passages, outer and inner concentric valve seats encircling said connection, an inner longitudinally movable valve having a sleeve portion adapted to engage said inner seat, and an outer longitudinally movable valve having a sleeved portion surrounding said inner valve and terminating in an annular edge concentrically disposed with said outer seat, said outer valve having a hollow stem whereby access may be had to said inner valve.

3. In faucet or valve structure, a body having intake and outlet passages, the inner ends of said passages being disposed in juxtaposition, a stud projecting into one of said passages having a hollow portion adapted to connect said passages, inner and outer concentric annular seats surrounding said stud, an inner valve having a sleeved portion surrounding said stud and having threaded engagement with the outer portion thereof, an outer tubular valve surrounding said inner valve and terminating in an annular edge concentric with said outer seat, removable means for closing the outer end of said outer valve, and means for moving said outer valve longitudinally relatively to said body.

In testimony whereof I affix my signature.

WILLIAM J. MATTSON.